Figure 1:
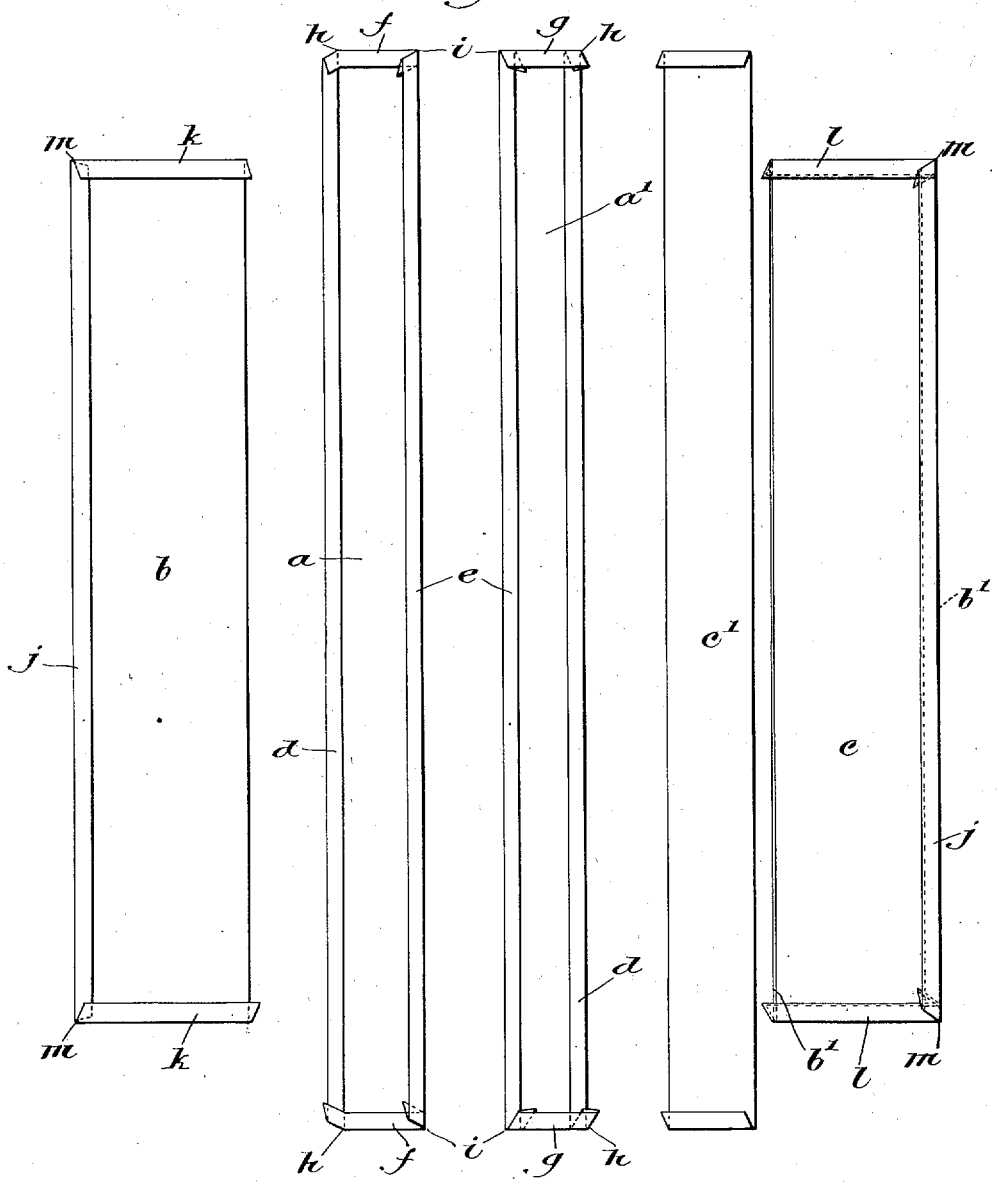

2 Sheets—Sheet 1.

A. D. FENWICK.

COLLAR, &c.

(Application filed Mar. 5, 1898.)

No. 11,683. Reissued July 26, 1898.

Witnesses:

A. C. Harwood.

Edward H. Allen.

Inventor:

Albert D. Fenwick by Lemsby & Gregory attys.

2 Sheets—Sheet 2.

A. D. FENWICK.

COLLAR, &c.

(Application filed Mar. 5, 1898.)

No. 11,683. Reissued July 26, 1898.

Witnesses:

A. C. Harwood

Edward F. Allen.

Inventor:

Albert D. Fenwick by Crosby & Gregory

Attys.

UNITED STATES PATENT OFFICE.

ALBERT D. FENWICK, OF PHILADELPHIA, PENNSYLVANIA, ASSIGNOR, BY DIRECT AND MESNE ASSIGNMENTS, TO THE FENWICK COLLAR AND CUFF MACHINE COMPANY, OF SAME PLACE.

COLLAR, &c.

SPECIFICATION forming part of Reissued Letters Patent No. 11,683, dated July 26, 1898.

Original No. 555,943, dated March 10, 1896. Application for reissue filed March 5, 1898. Serial No. 673,876.

*To all whom it may concern:*

Be it known that I, ALBERT D. FENWICK, a citizen of the United States, residing at Philadelphia, in the county of Philadelphia and State of Pennsylvania, have invented certain new and useful Improvements in Collars or Analogous Articles, of which the following is a specification.

My invention has relation to collars or analogous articles.

The principal objects of my invention are, first, to provide a collar or analogous article containing or comprising two blanks and a filling or stiffener being folded inwardly and united by stitches passed through and through the folded or lapped edges thereof, the folds at the ends or corners of the blanks being dovetailed or interlapped together and secured by stitching, and, second, to provide a collar or analogous article having a body made from blanks having the longitudinal and end edges turned in or over and united by stitching, and a complemental band having turned in or over edges united therewith by stitching, the corners or ends of the band being reinforced or locked together by the interlapping of the parts of the blanks at the ends thereat, the body and band being secured together by stitching, thus avoiding the operation of first running and then turning or reversing and pressing the blanks in the production of the collar.

Hitherto in the making of collars or the like it has been customary to unite the blanks constituting the body and band of the collar by stitches along their meeting edges, the two parts of the band being then turned and their lower edges stitched together.

In accordance with my invention the collar is composed of two members—viz., a body containing two blanks and a filling or stiffener, the top edges and ends of said blanks and stiffener being inturned and united by stitching, a band coöperating with said body, said band comprising or containing two blanks and a stiffener having their longitudinal and end edges turned in or over, portions of said blank being united to other portions thereof by stitching, and the upper longitudinal edge of the band being united with the body by stitching, thereby enabling a collar to be cheaply made right side out or without turning, thus reducing the number of operations for producing the same for the reason that the blanks or stiffeners having their edges inturned and stitched together, as described, may be readily assembled, the body entering the band and being united thereto to constitute the article for use.

My invention consists of a collar or analogous article produced in the manner hereinafter described and claimed.

The nature, scope, and characteristic features of my invention will be more fully understood from the following description, taken in connection with the accompanying drawings, forming part thereof, and in which—

Figure 2:
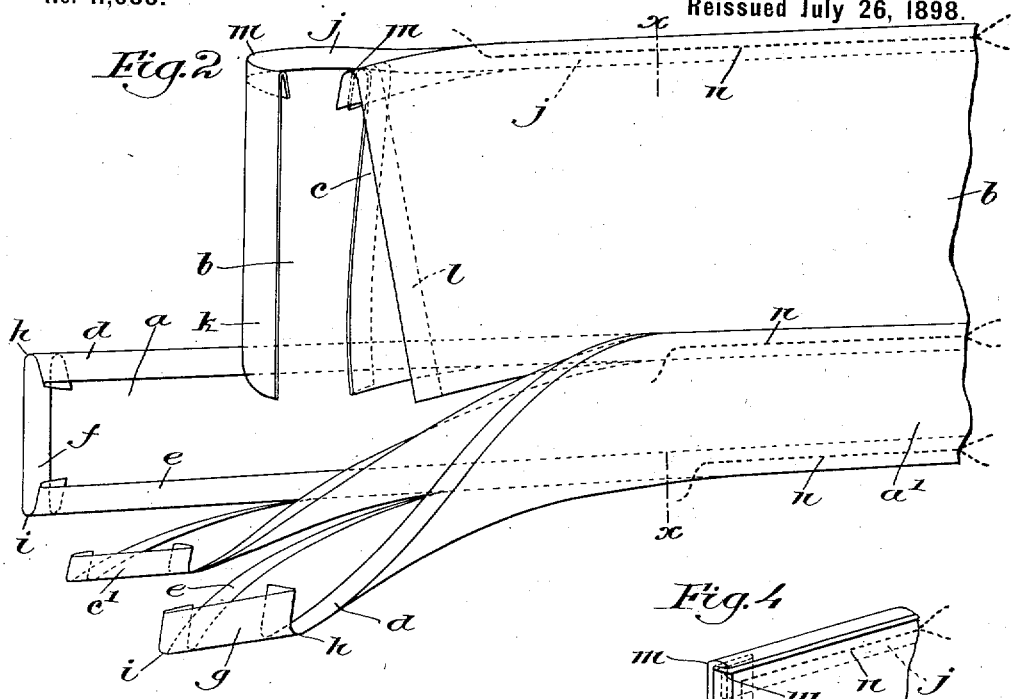
Figure 4:
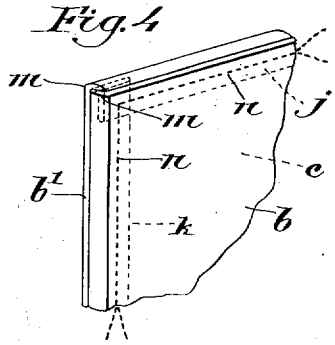
Figure 3:
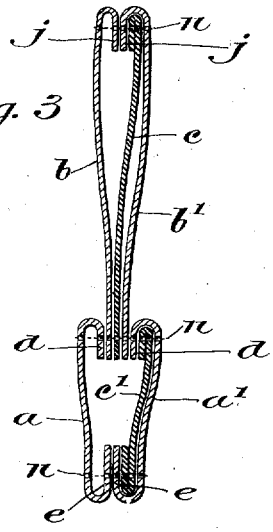

Figure 1 is a plan view of the blanks and stiffeners necessary to form a collar of my invention, the edges of said blanks being lapped in or turned over and the blanks and stiffeners being shown therein in a form ready to be united by a sewing operation through the lapped in or over edges to produce an article having gutter edges at the end and longitudinal edges of the same. Fig. 2 is a perspective view, on an enlarged scale, showing one end of a collar of my invention with parts thereof partially opened outwardly to disclose the interior of the same. Fig. 3 is a cross-sectional view on the line $x\ x$ of Fig. 2, and Fig. 4 is an enlarged perspective view of the locked or reinforced corner of the collar or analogous article.

In the drawings are illustrated a collar and the method of making the same according to my invention.

With reference now to the drawings, $a$ and $a'$ are blanks of suitable material forming the neckband of the collar; $b$ and $b'$, the body-blanks, and $c$ and $c'$ the internal stiffeners of the body and band of the article, made of cloth, duck, or the like.

The assembled blanks $a$ and $a'$ in Figs. 2 and 3 for the band have their horizontal upper and lower edges $d$ and $e$, respectively, lapped in or folded down upon the complementally folded-in edge of the stiffener $c'$ on one side and on the other onto the inside body of the blanks, forming adjacent to the edges on one side a double thickness and on the other side, provided with the folded-edge stiffeners, four thicknesses of the materials, as fully illustrated in Fig. 3. The ends $f$ and $g$ are turned in or lapped down in the same manner, constituting at the upper and lower corners of the neckband on one side eight thicknesses of material, considering the filling or stiffener $c'$ as a part thereof, and at the upper and lower corners of the neckband on the other side four thicknesses of material, and between the corners on both sides, respectively, two and four thicknesses of material, as will be readily understood from Fig. 2 of the drawings.

The horizontal upper edges $j$ of the blanks $b$ and $b'$ are lapped in or folded down in a similar manner as the edges $d$ and $e$ of the blanks $a$ and $a'$, and the ends $k$ and $l$ of the blanks $b$ and $b'$ are likewise folded in a similar manner as the edges $f$ and $g$ of the blanks $a$ and $a'$, so that there are thus formed six thicknesses of the material along the longitudinal and end edges of the blanks $b$ and $b'$, except at the corners $m$, where twelve thicknesses of material are presented. It is found preferable, for reasons hereinafter mentioned, to form the corners $h$ and $i$ of the neckband-blanks and the corners $m$ of the body-blanks as follows: In one blank—for example, $a$ of the neckband—the end fold $f$ extends along the entire end from the upper to the lower longitudinal edges $d$ and $e$ of the blank $a$ before the same are turned down, and a portion of said fold $f$ is therefore turned in or infolded by said longitudinal folds, while in the other blank $a'$ the end fold $g$ is folded down after the upper and lower folds $d$ and $e$ are formed, thus turning in from the end a portion of said folds $d$ and $e$. In the same manner the corners $m$ of the blanks $b$ and $b'$ are respectively formed by infolding, say, in one blank $b$ the end fold $k$, or, as in the other blank $b'$, by turning in the upper fold $j$. The corners of the blanks, folded as stated, are then interlocked at the junctions of the longitudinal edges and ends by having one interlapped or tucked under the other. The stiffener or filling $c$ may be placed on the unfolded blank and its edges folded in and down when the edges of the respective blanks are folded in or over, as illustrated in Fig. 3, or it may be inserted under the lapped or folded upper edge $j$ of either blank $b$ or $b'$ and $a$ or $a'$ and permanently secured thereto, thus leaving the collar in a condition for stitching the blanks together to complete the same.

The completion of the collar is accomplished in the following manner: The body-blanks $b$ and $b'$ and the stiffener $c$ are united together by stitches $n$, passing through and through the material at its lapped or folded edges $j$, $k$, and $l$, these lapped portions facing each other, as will be readily understood, and the lapped edge $l$ of the blank $b'$ at its upper end being tucked under the end of the lapped edge $j$ of the blank $b$. The blanks $a$ and $a'$ are then placed on either side of the body and its stiffener and united thereto by continuing the stitching $n$ around the band and through its lapped edges $d$, $e$, $f$, and $g$, these lapped edges of course facing each other and the end $g$ of the blank $a'$ dovetailing into the groove formed in the other blank between the turned-down edges $d$ and $e$.

It may be here remarked that ornamental stitching may be employed.

My invention is applicable to the manufacture of collars and cuffs of all sizes and shapes, formed first into blanks and then united by stitching and with gutter edges at the sides, ends, and top when united by being sewed together in the manner hereinbefore explained.

By such method of manufacture of the aforesaid article a great saving in material, time, and labor is effected, since the article is finished by two operations—first, the turning in or over of the edges of the blanks with the inserted stiffeners beneath the edges of one of the blanks of the body and neckband, and, second, uniting the blanks of the body and neckband together by a stitching operation on a sewing-machine.

Having fully described my invention, what I claim, and desire to secure by Letters Patent, is—

1. A collar or analogous article, comprising two blanks, the longitudinal edges and ends of said blanks being infolded one toward the other and interlocked at the corners formed by the junctions of said edges and ends, said interlocked corners being each formed by having a longitudinal folded edge of one blank folded onto the adjacent end fold thereof and in the other blank the corresponding end fold folded onto the longitudinal folded edge thereof, and the said longitudinal folded edge of said former blank interlapped or tucked under the said end fold of the last-mentioned blank, said blanks being stitched together, substantially as described.

2. A collar or analogous article comprising body-blanks, and neckband-blanks having infolded edges laid next each other, the corners being severally formed by having the corner of one blank of the longitudinal folded edge folded onto the end folded edge thereof, and in the adjacent blank the end folded edge folded onto the longitudinal folded edge thereof and interlapped; the bottom unfolded edges of the body-blanks being inserted between the top infolded edges of the neckband-blanks, and the whole united together only by stitches which pass from outside to outside of the article and through the infolded edges, substantially as described.

3. A collar or analogous article consisting of a body, and a band, the body and band each containing two plies the edges and ends of the said plies being infolded one toward the other and interlocked at the junctions of the edges and ends, and stitched together, substantially as described.

In testimony whereof I have signed my name to this specification in the presence of two subscribing witnesses.

ALBERT D. FENWICK.

Witnesses:
GEO. W. GREGORY,
GEO. H. MAXWELL.